(12) United States Patent
Carney

(10) Patent No.: US 7,451,444 B2
(45) Date of Patent: Nov. 11, 2008

(54) COMPUTER-IMPLEMENTED SYSTEM AND METHOD FOR MANAGING SERVICE AGENTS

(75) Inventor: Michael G. Carney, Cary, NC (US)

(73) Assignee: SAS Institute Inc., Cary, NC (US)

( * ) Notice: Subject to any disclaimer, the term of this patent is extended or adjusted under 35 U.S.C. 154(b) by 883 days.

(21) Appl. No.: 10/674,749

(22) Filed: Sep. 30, 2003

(65) Prior Publication Data

US 2005/0081205 A1   Apr. 14, 2005

(51) Int. Cl.
*G06F 9/46* (2006.01)
(52) U.S. Cl. .................................... 718/100
(58) Field of Classification Search ................. 718/100
See application file for complete search history.

(56) References Cited

U.S. PATENT DOCUMENTS

| | | | |
|---|---|---|---|
| 5,355,488 A | 10/1994 | Cox et al. | |
| 5,630,128 A | 5/1997 | Farrell et al. | |
| 5,832,484 A * | 11/1998 | Sankaran et al. | 707/8 |
| 5,835,763 A | 11/1998 | Klein | |
| 5,898,832 A * | 4/1999 | Feridun | 709/203 |
| 5,961,584 A | 10/1999 | Wolf | |
| 5,991,792 A | 11/1999 | Nageswaran | |
| 6,012,081 A | 1/2000 | Dorn et al. | |
| 7,080,375 B2 * | 7/2006 | Martin | 718/100 |
| 7,137,120 B2 * | 11/2006 | Armstrong et al. | 718/107 |

OTHER PUBLICATIONS

Static Analyses for Eliminating Unnecessary Synchronization from Java Programs Johnathan Aldrich, Craig Chambers, Emin Dun Sirer, and Susan Eggers pringer-Verlag Berlin Heidelberg 1999, p. 19-28.*

* cited by examiner

*Primary Examiner*—Meng-Ai An
*Assistant Examiner*—Mengyao Zhe
(74) *Attorney, Agent, or Firm*—Jones Day

(57) ABSTRACT

Computer-implemented systems and methods for allowing a first processing type of software programs to be able to utilize a second processing type of software programs. For example, software programs that utilize a thread-based approach can utilize a different processing type of software programs, such as task-based software programs or other single-threaded type of software programs.

34 Claims, 23 Drawing Sheets

COMPUTER-IMPLEMENTED SYSTEM AND METHOD FOR MANAGING SERVICE AGENTS

TECHNICAL FIELD

The present invention relates generally to computer-implemented resource handling systems and more particularly to handling requests to computer-based services.

BACKGROUND

Advances in computer and software programming technology usually are heralded with the benefits the advances bring. The benefits are typically performance, security, programming paradigm improvements or other types of advantages. However, advances typically bring undesired consequences, such as the technological advances may not be usable with pre-existing software programs.

In such situations, a major development project must be undertaken to either substantially alter the pre-existing programs or to write new code from scratch that can take advantage of the technological advances. Accordingly, the time and resources expended in developing, implementing, testing, deploying, and maintaining pre-existing programs or legacy systems are mostly lost.

SUMMARY

To address these and other issues, systems and methods are disclosed in accordance with the teachings provided herein that allow a first processing type of software program to be able to utilize a second processing type of software program. For example, software programs that utilize a thread-based approach can utilize a different processing type of software program, such as a task-based software program or single-threaded software program.

A dispatching mechanism allows a first type of software program to access service programs that utilize a different processing technology. Within the dispatching mechanism, a first lock allows only one requesting thread into a dispatch section at a time. A second lock synchronizes the requesting thread that is in the dispatch section with a service agent. After the requesting thread releases the first and second lock, the service agent handles the request of the requesting thread.

DETAILED DESCRIPTION

Figure 1:
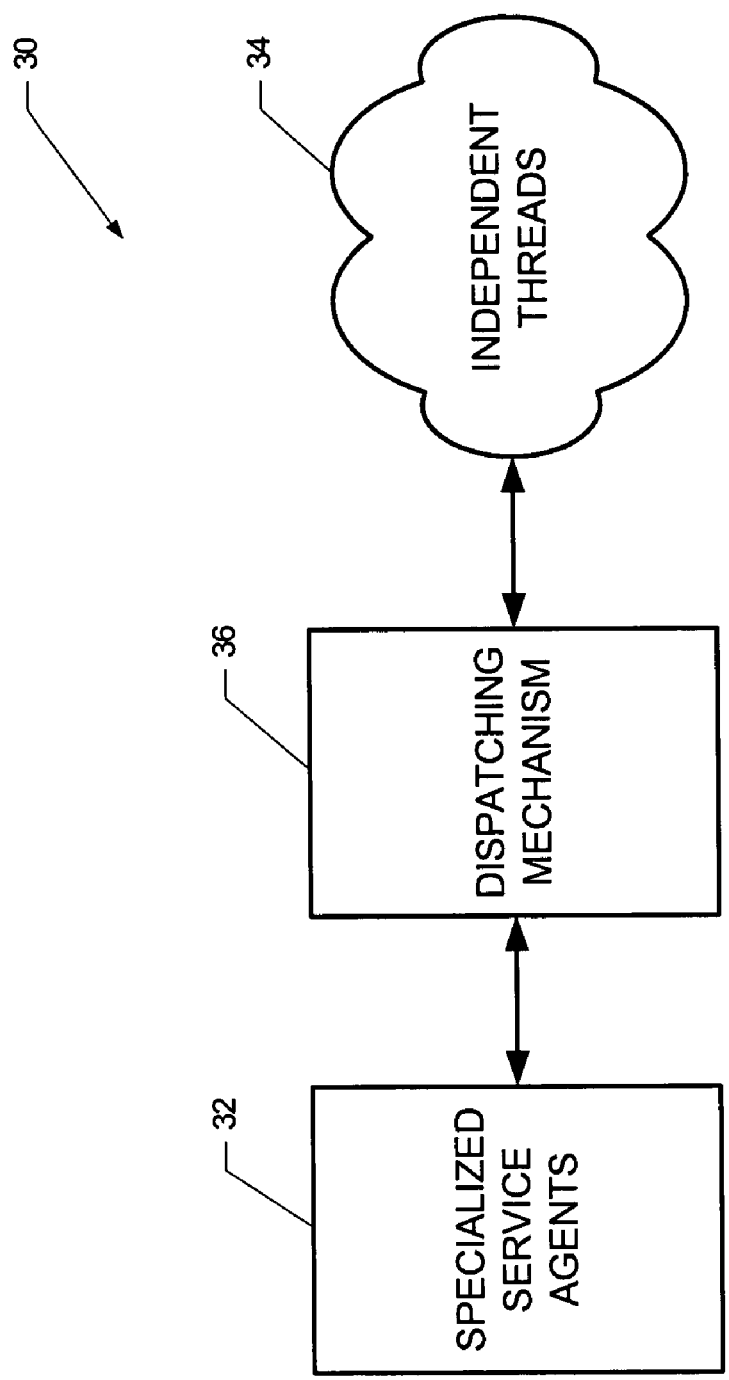
FIG. 1 is a block diagram depicting a services dispatching system.

FIG. 1 depicts a computer-implemented system 30 that provides a direct, thread safe dispatch into a pool of specialized service agents 32. It might be used in a threaded server or applications 34 where a quick dispatch of work into a pool of specialized agents 32 is needed. Agents can perform many different types of services, such as I/O services (e.g., file access, database records access), data formatting services (e.g., currency formatting), etc.

A dispatching mechanism 36 is interposed between the resource requesting threads 34 and the specialized service agents 32. The dispatching mechanism 36 is configured such that it can handle thread requests in a disparate computer processing environment. The disparate computer environment arises because the threads 34 requesting services operate asynchronously with respect to each other whereas the service agents 32 operate using a different processing paradigm. As an illustration, the service agents 32 may operate synchronously with respect to each other.

Figure 2:
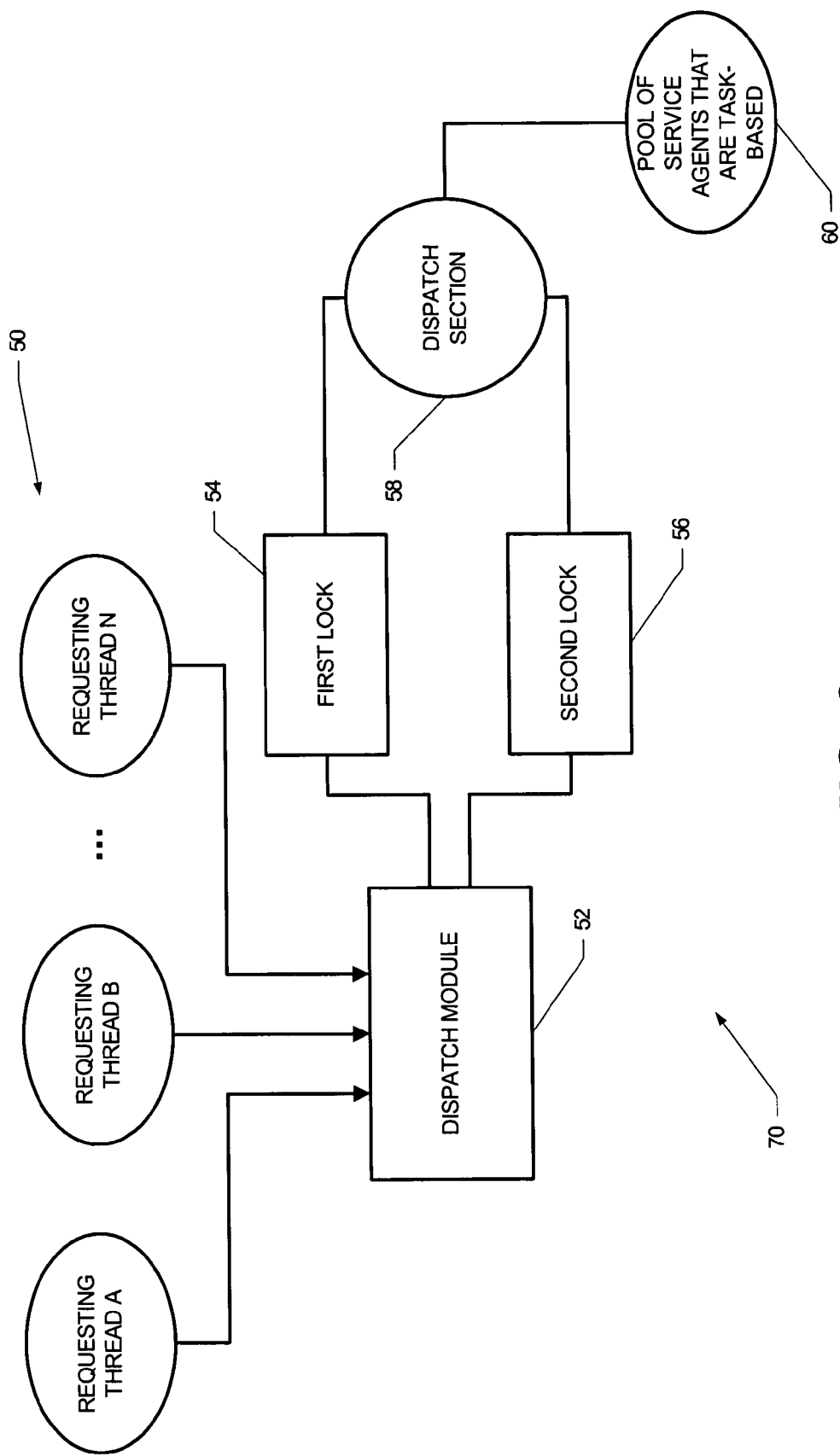
FIG. 2 is a block diagram depicting software and computer components utilized in a services dispatching system.

FIG. 2 depicts a dispatching mechanism using nested locks (54, 56) to handle requests. The term "nested" means the second lock is acquired while holding the first lock. With reference to FIG. 2, requesting threads 50 prepare the requisite parameters and call a dispatch module 52. The dispatch module 52 works in conjunction with a nested region or lock set (54, 56). The first lock 54 allows only one of the requesting threads 50 into the dispatch section 58 at a time. There may be a "long" wait at this lock 54, but requesting threads 50 are asynchronous with respect to one another so others can continue to process. This synchronization point at the first lock 54 is used in the process for dispatching (or assigning) the service request, not for awaiting its completion.

The second, nested lock 56 synchronizes the single dispatching requesting thread with any active tasks entering the free pool 60. This lock 56 may be implemented as a "short" wait lock because agents that are task-based are synchronous at this type of lock—that is, while one is awaiting this type of lock, no others can proceed.

The dispatch module 52 selects a free service agent from the pool 60 to perform the work, and passes a parameter set to it. If there is no free task, the dispatch module 52 may request and await the creation of another task or decide to wait on an extant task to complete its assignment. A dispatched task loads the requested service routine image if it was not already loaded and invokes it with the parameter set prepared by the thread domain application. When the task completes its request it signals such to the waiting thread application, reenters the pool 60 of free tasks, and awaits another request. Such an approach provides a way for any number of threads to drive any number of tasks, with the tasks completing in any order and the threads resuming execution. System 70 enables leveraging legacy technology (such as, task-based code) by giving the new code that runs in threads a way to execute the legacy technology.

It is noted that threads and task-based code differ in several respects. Threads operate in a multi-threaded environment, while task-based code operates in a single-threaded environment, such as in a cooperative multi-tasking environment. In general, more than one thread can be executing at the same time, but more than one task cannot be executing at the same time ("executing" means "running" or "using processor cycles"; it does not include "waiting for I/O"). More specifically, a task is a cooperatively scheduled entity, and only one task can run at a time in a process. A task must usually wait to run until it is implicitly scheduled by another task yielding control of the processor. An example of task-based services code includes SAS procedures from the multi-vendor architecture (available from SAS Institute, Inc. with offices in Cary, N.C.). A thread is a preemptively scheduled entity, whose execution is controlled in large part by the scheduling mechanisms of the native operating system.

Figure 3:
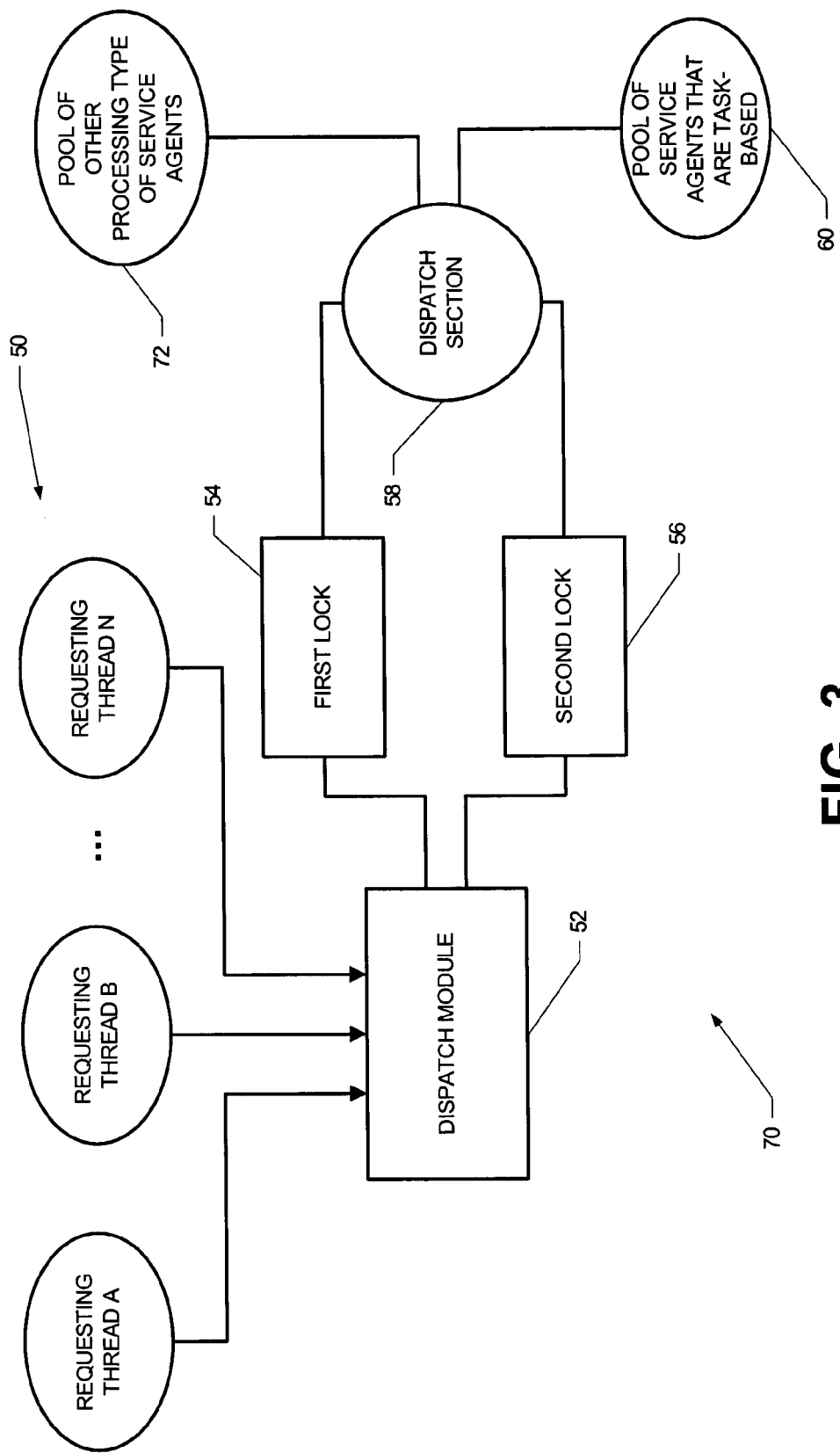
FIG. 3 is a block diagram depicting different processing types of services being utilized in a services dispatching system.

The dispatching mechanism 52 may be used with other types of service programs 72 as shown in FIG. 3. For example, the service agents 72 may be thread-based. The first lock 54 allows only one of the requesting threads 50 into the dispatch section 58 at a time. The second, nested lock 56 synchronizes the single dispatching requesting thread with any active service threads entering the free pool 72. If a service thread is not available for dispatch, the requesting thread releases the second lock 56 and waits on the arrival in the pool 72 of a free service thread. The dispatch module 52 may be implemented such that a request is handled by a service agent contained in either pool 60 or pool 72. Whether a request should go to pool 60 or pool 72 may be based upon which pool renders the desired service.

The dispatching mechanism 52 provides a direct, thread safe, cross-domain dispatch, thereby allowing companies to utilize pre-existing service code while also utilizing services that take advantage of the latest advancements. It is noted that a routine is thread-safe if it can be called simultaneously from multiple threads without the risk of corruption. When a program must call a routine that is not thread-safe, the dispatching mechanism 52 provides for appropriate synchronization (e.g., between two threads requesting two I/O services from task-based service agents) of the unsafe routine across all threads in a program. Thread-safety is addressed by the dispatching mechanism not only between two concurrent threads but also between a thread and a task-based service agent running concurrently.

The dispatch mechanism 52 preferably does not queue requests or dispatch via a separate thread or task. Thus the cost of queuing/dequeuing may be avoided, and parameter/result marshaling and de-marshaling may be minimized. It should be understood that either processing paradigm-based service may be used with the nested lock approach or only one type depending upon the implementation at hand.

The dispatch mechanism 52 allows for a cross-domain environment, such as by allowing for different processing paradigms to be utilized for the service agents. Thus, the mechanism can allow threading, and the ability to use thread service agents asynchronously, while also providing the serialization of access to task-based service agents.

Figure 4:
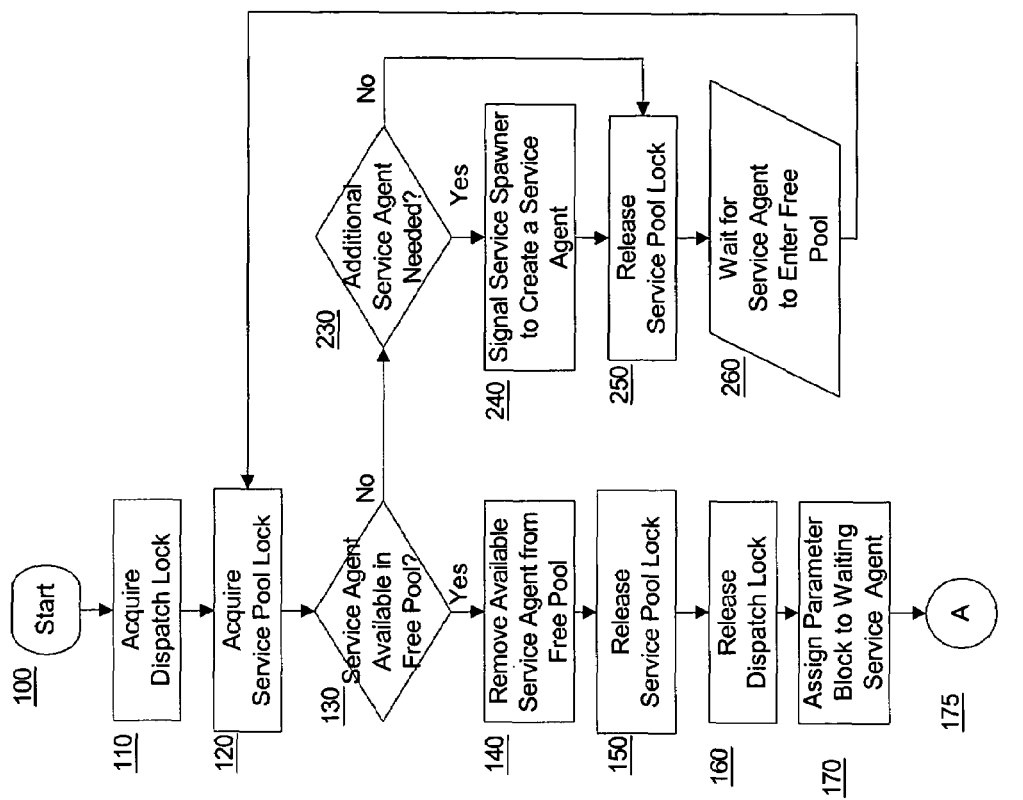
FIGS. 4 and 5 are flowcharts depicting an operational scenario involving a services dispatching system.

FIG. 4 depicts an operational scenario utilizing the nested locking approach. Start indication block 100 indicates that at steps 110 and 120, the dispatch lock (first lock) and the service pool lock (second lock) is acquired. Decision step 130 examines whether a service agent (e.g., a task-based service agent, a thread-based service agent, etc.) is available in the free pool.

If a service agent is not available, then decision step 230 examines whether an additional service agent needs to be created to handle the request. If a service agent does not have to be created, then processing continues at step 250. If an additional service agent is needed then the service spawner (e.g., service creator) creates a service agent at step 240, and the service pool lock is released at step 250. At 260, processing waits for a service to enter the free pool. Processing then continues back at step 120.

If a service agent is available as determined at decision step 130, then the available service agent is removed from the free pool at step 140, and at step 150 the service pool lock is released. Step 160 releases the dispatch lock. Step 170 assigns a parameter block to the waiting service agent. Processing continues on FIG. 5 as indicated by continuation marker 175.

Figure 5:
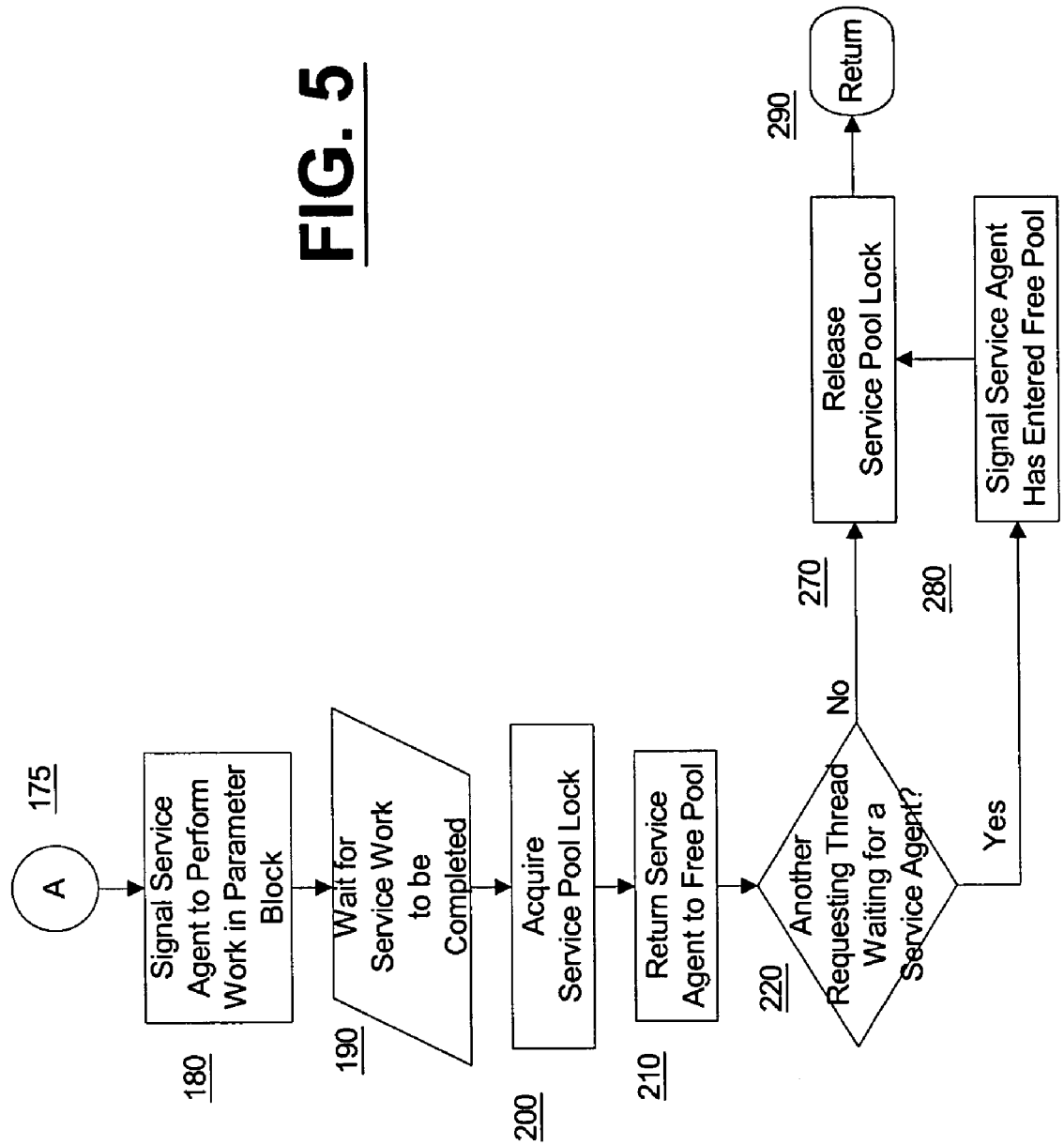

With reference to FIG. 5, step 180 signals the service agent to perform work specified in the parameter block. As an example, the parameter block may contain the following for a data formatting service agent:

Input parameters: a pointer to the internal-form currency value (which could point to a value in the caller's parameter stack); an integer code indicating that number-to-currency string conversion should be done and the type of currency.

Output parameters: a pointer to the area to receive the currency string (could point into the requester's automatic storage); an integer for the number of characters written to the string; an integer return code to indicate a failure particular to the operation.

At 190, processing waits for the service work to be completed. After the service work is completed, the service pool lock is acquired at step 200. At step 210, the service agent is returned to the free pool. Through such processing, the nested lock set allows requesters to hold in the dispatch section, waiting for an available service agent. This avoids request queuing while allowing a service agent to reenter the free pool.

Decision step 220 checks whether another requesting thread is waiting for service agent. If there are none, then the service pool lock is released at step 270 before processing ends until the next iteration. If there is another requesting thread waiting for service, then a signal is generated that a service agent has entered the free pool before processing continues at step 270.

It should be understood that similar to the other processing described herein, the steps and the order of the steps in the flowchart described herein may be altered, modified and/or augmented and still achieve the desired outcome.

Figure 6:
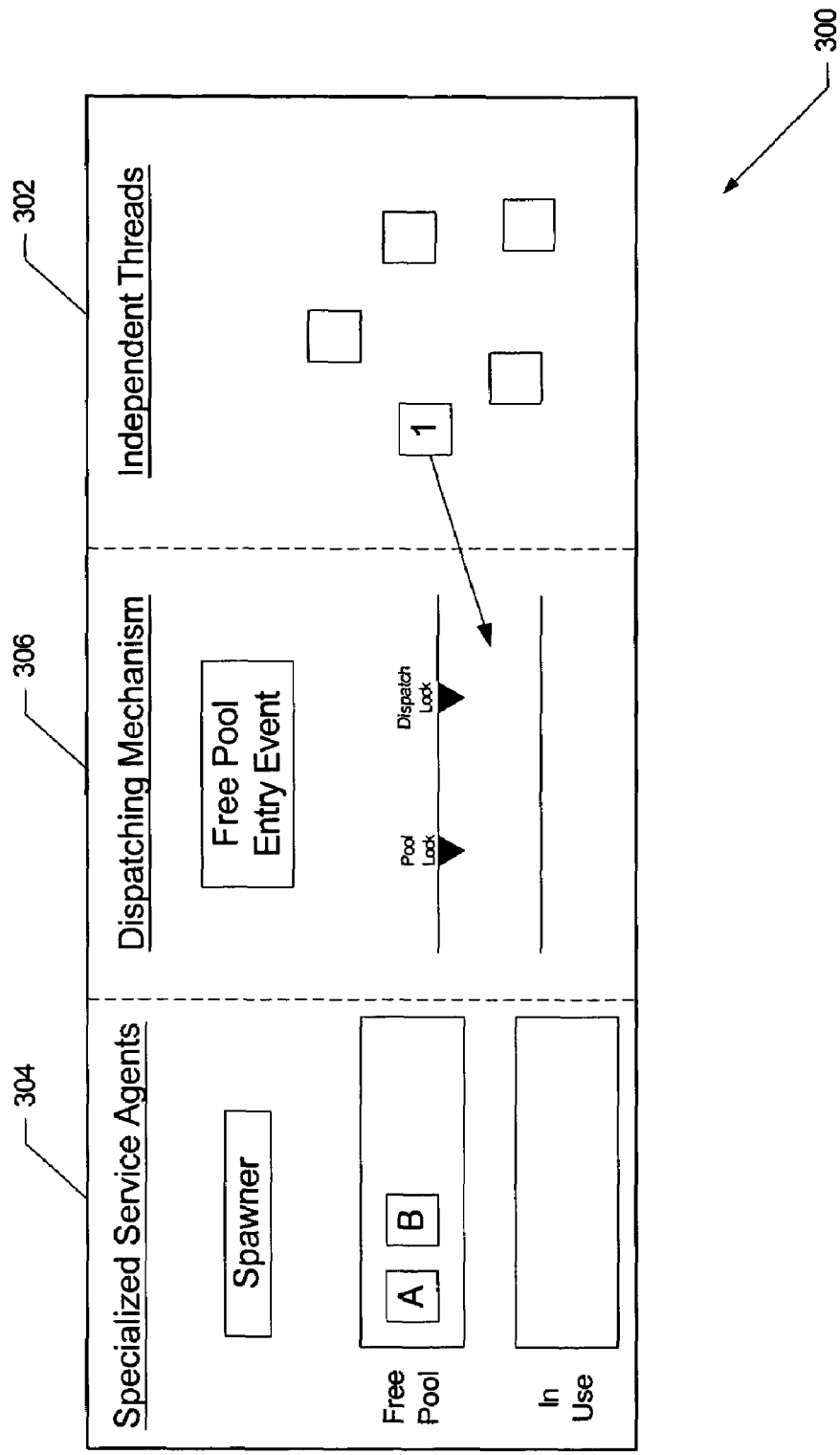
FIGS. 6-14 are block diagrams depicting an example involving a services dispatching system.

FIGS. 6-22 illustrate additional examples involved in a services dispatching system. FIG. 6 depicts independent threads 302 requesting service agents 304 through a dispatching mechanism 306. In this example, one of the independent threads 302 (labeled with a "1") accesses the dispatching mechanism 306. At this point, services A and B are available in the free pool, and none of the locks (e.g., dispatch lock or pool lock) have been acquired.

Figure 7:
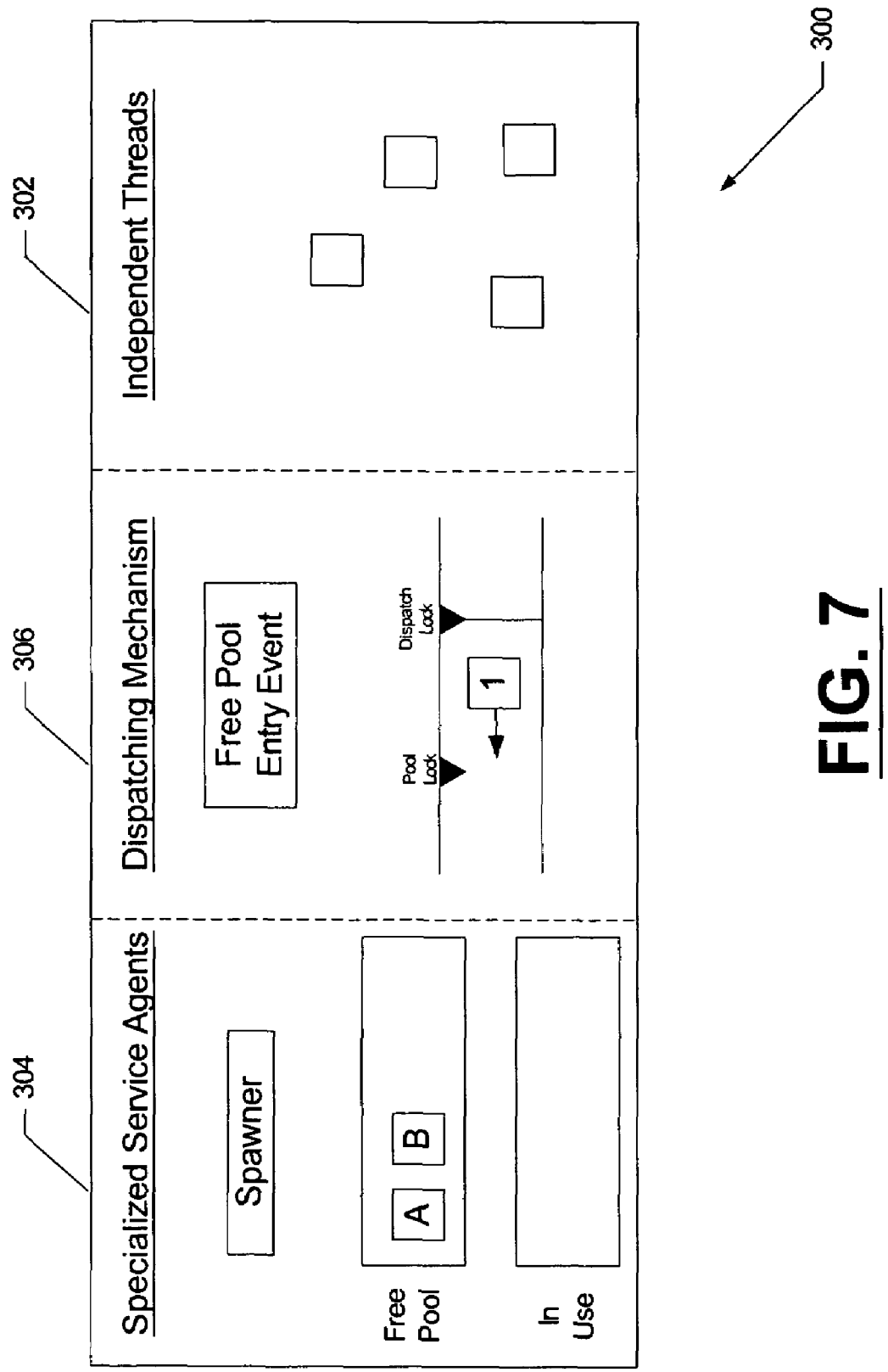
Figure 8:
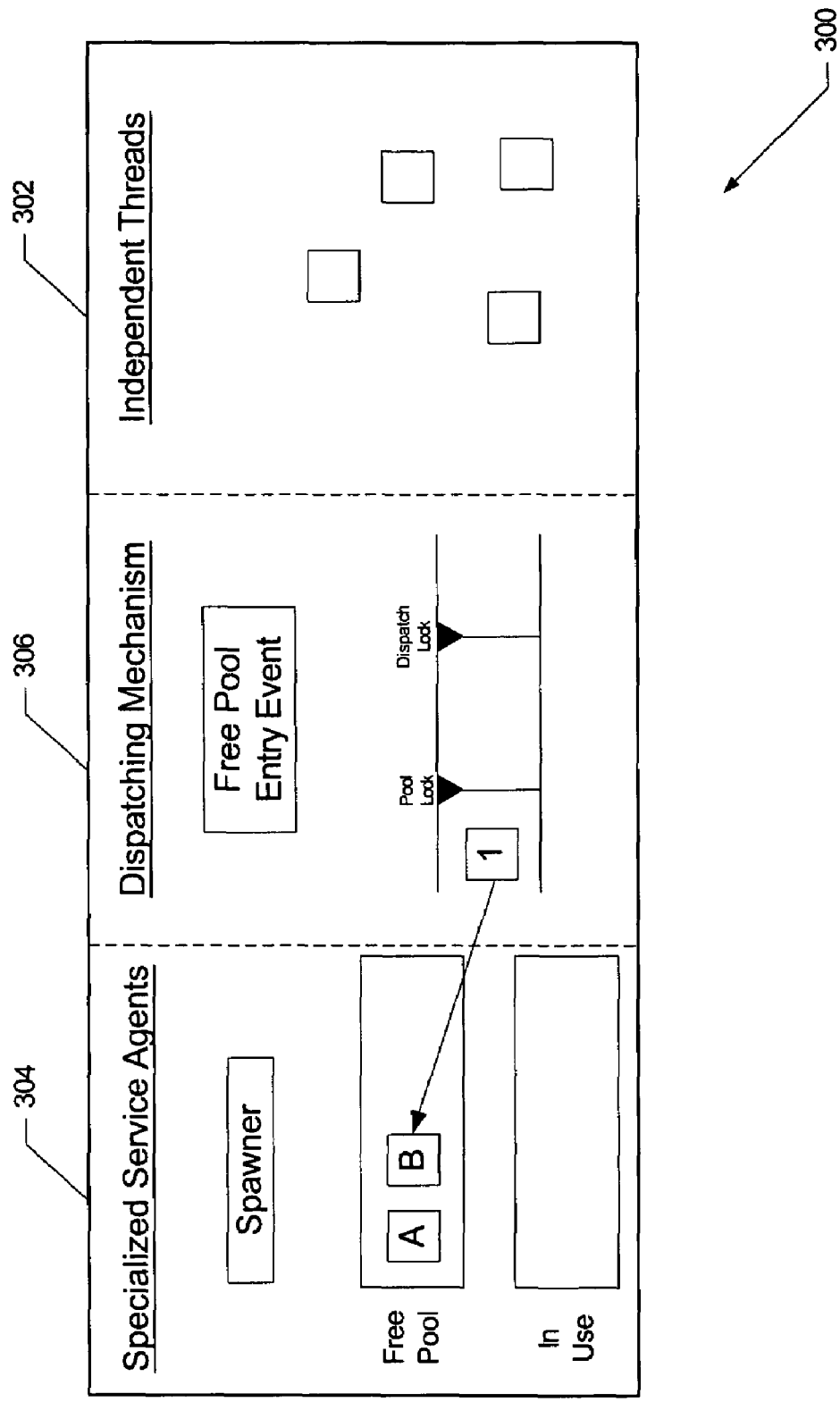

FIG. 7 shows that requesting thread "1" has acquired the dispatch lock. FIG. 8 shows that the requesting thread has acquired the pool lock. Because service agent B is available in the free pool, it can be used to service the request of the requesting thread. A requesting thread prepares the service-specific parameters by passing their addresses/values in a generic way to the direct dispatch method, such as in a control block instance that is private to the requesting thread.

Figure 9:
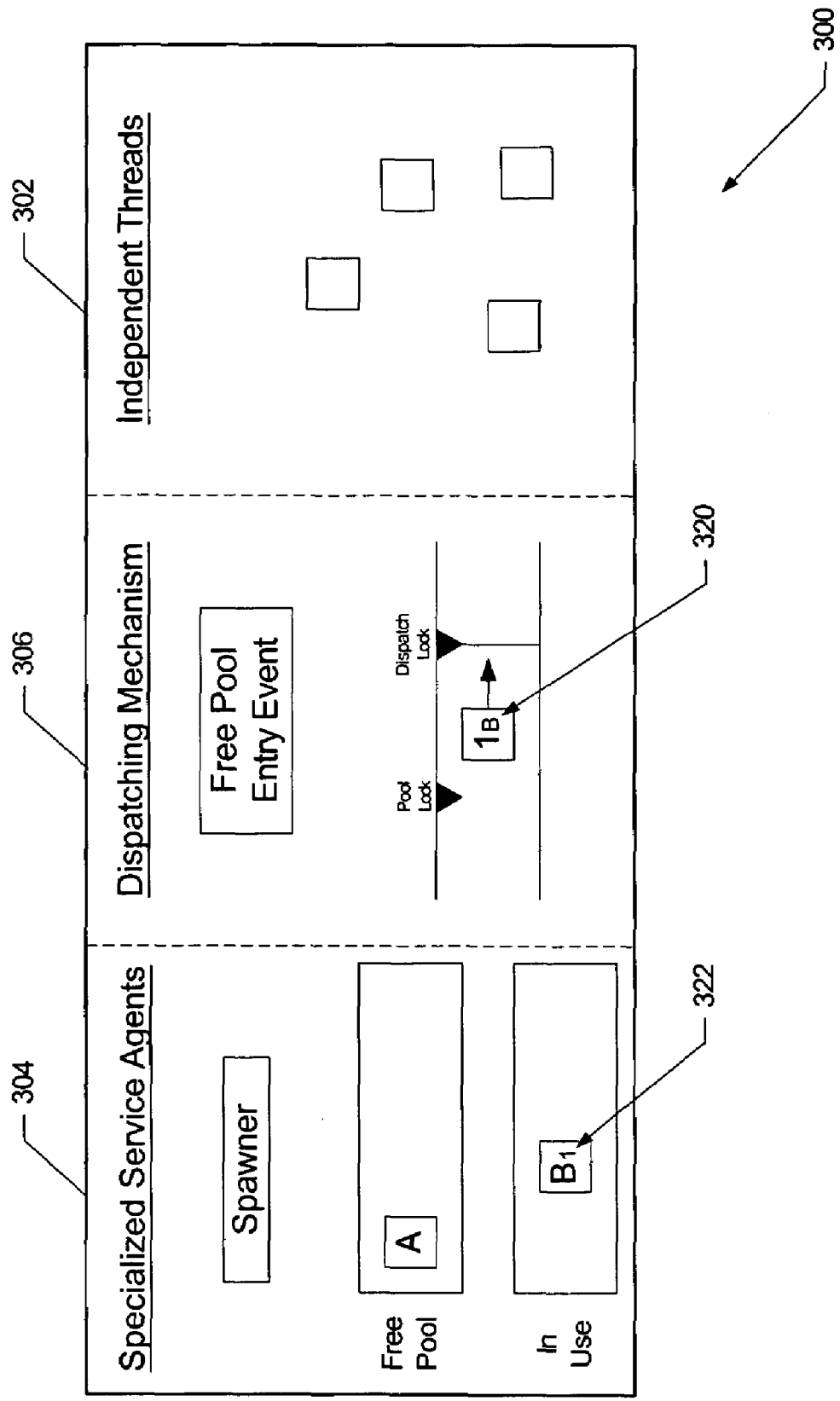

As shown in FIG. 9, service agent B is in use at this point and the pool lock is released for the requesting thread "1". The "B" shown at reference number 320 for requesting task "1" and the "1" shown at reference number 322 for service agent B indicate the synchronization between that requesting task and the service agent.

Figure 10:
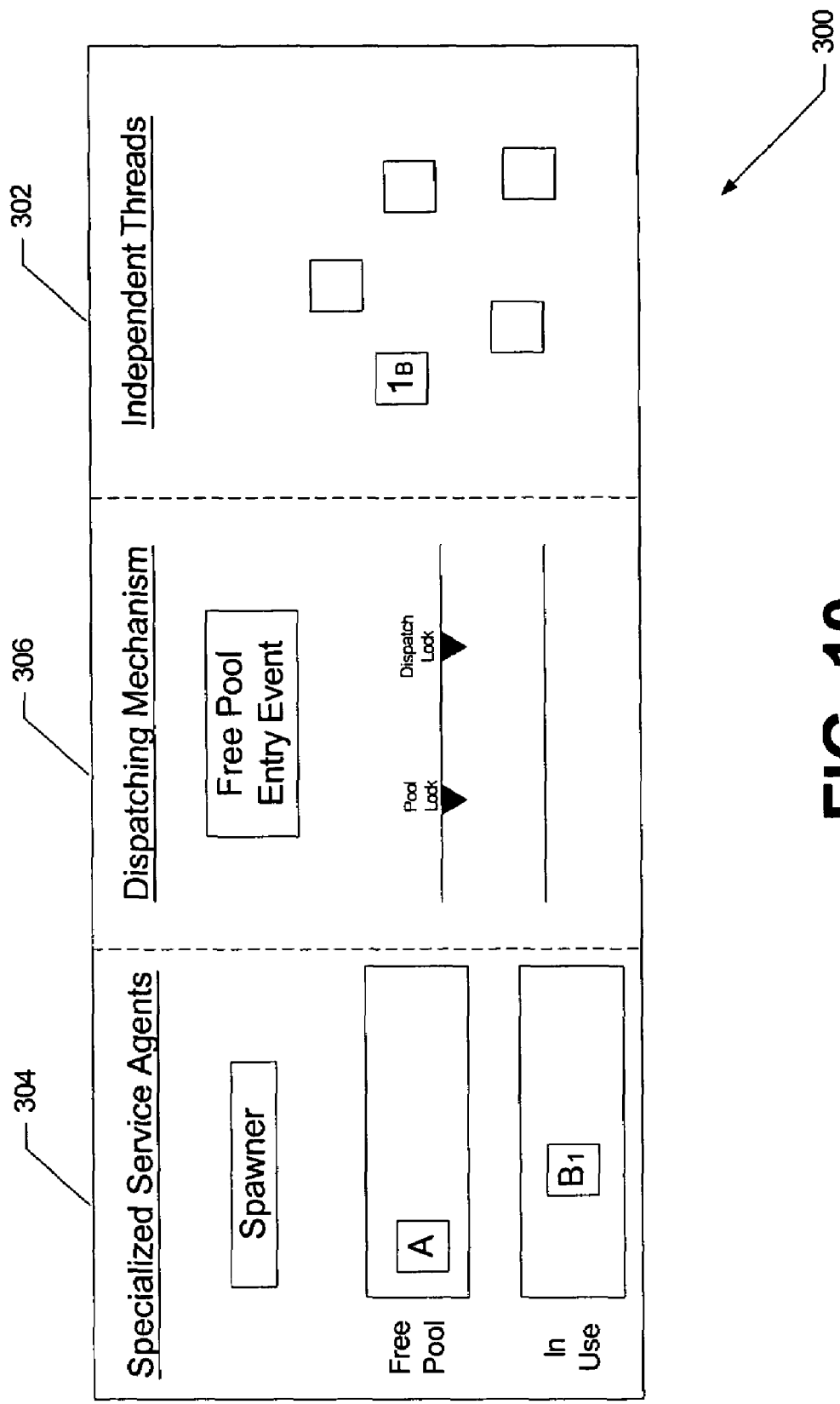
Figure 11:
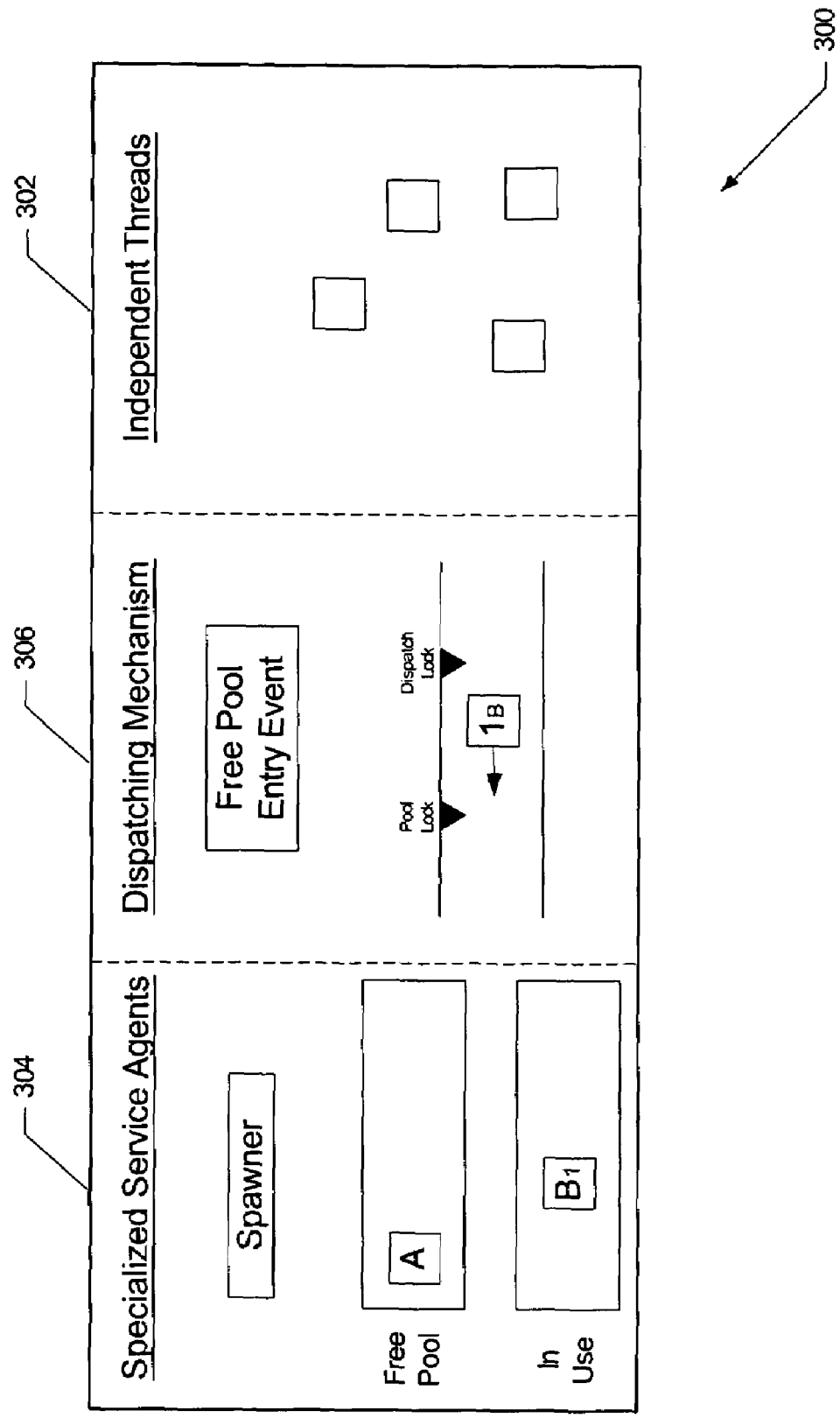
Figure 12:
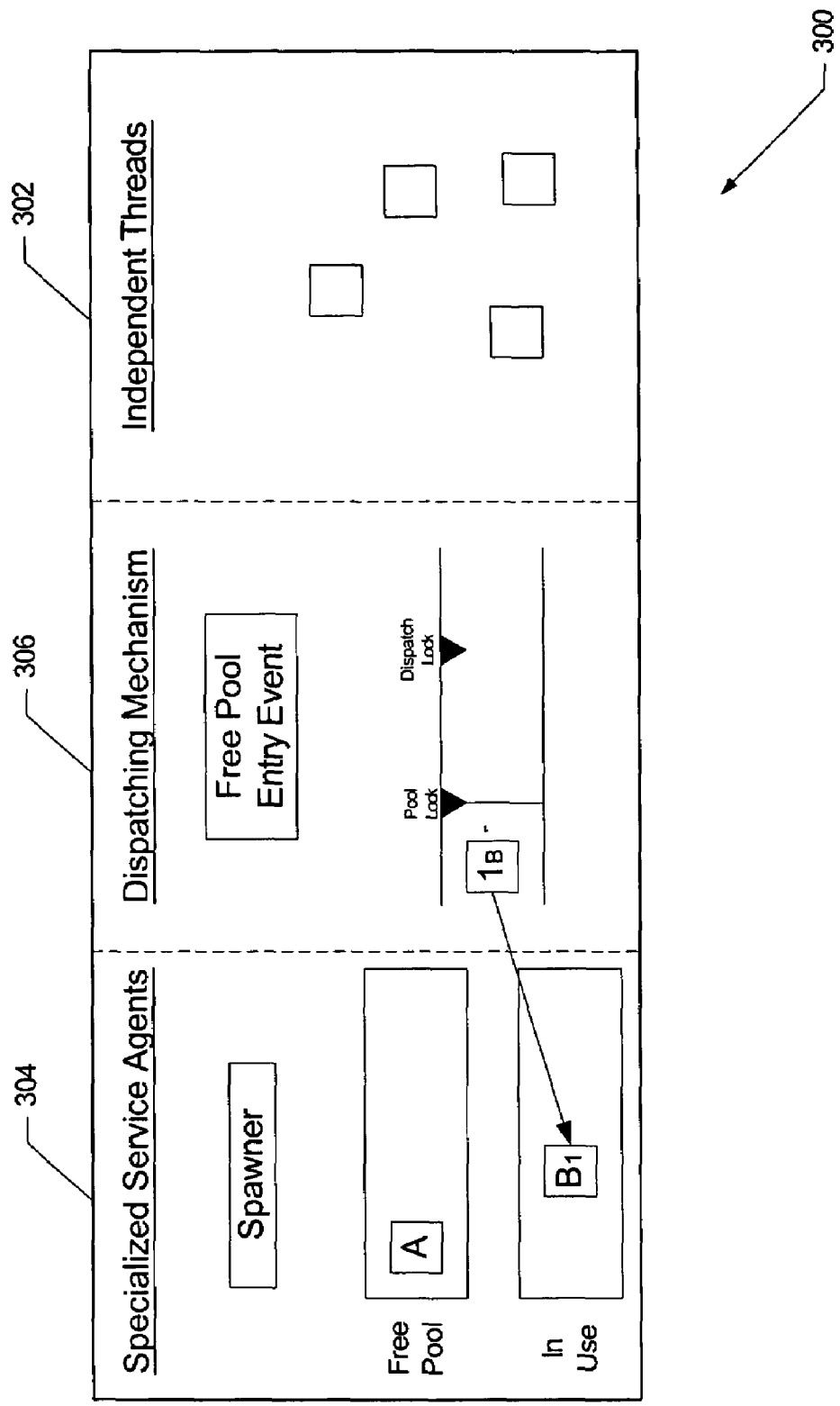
Figure 13:
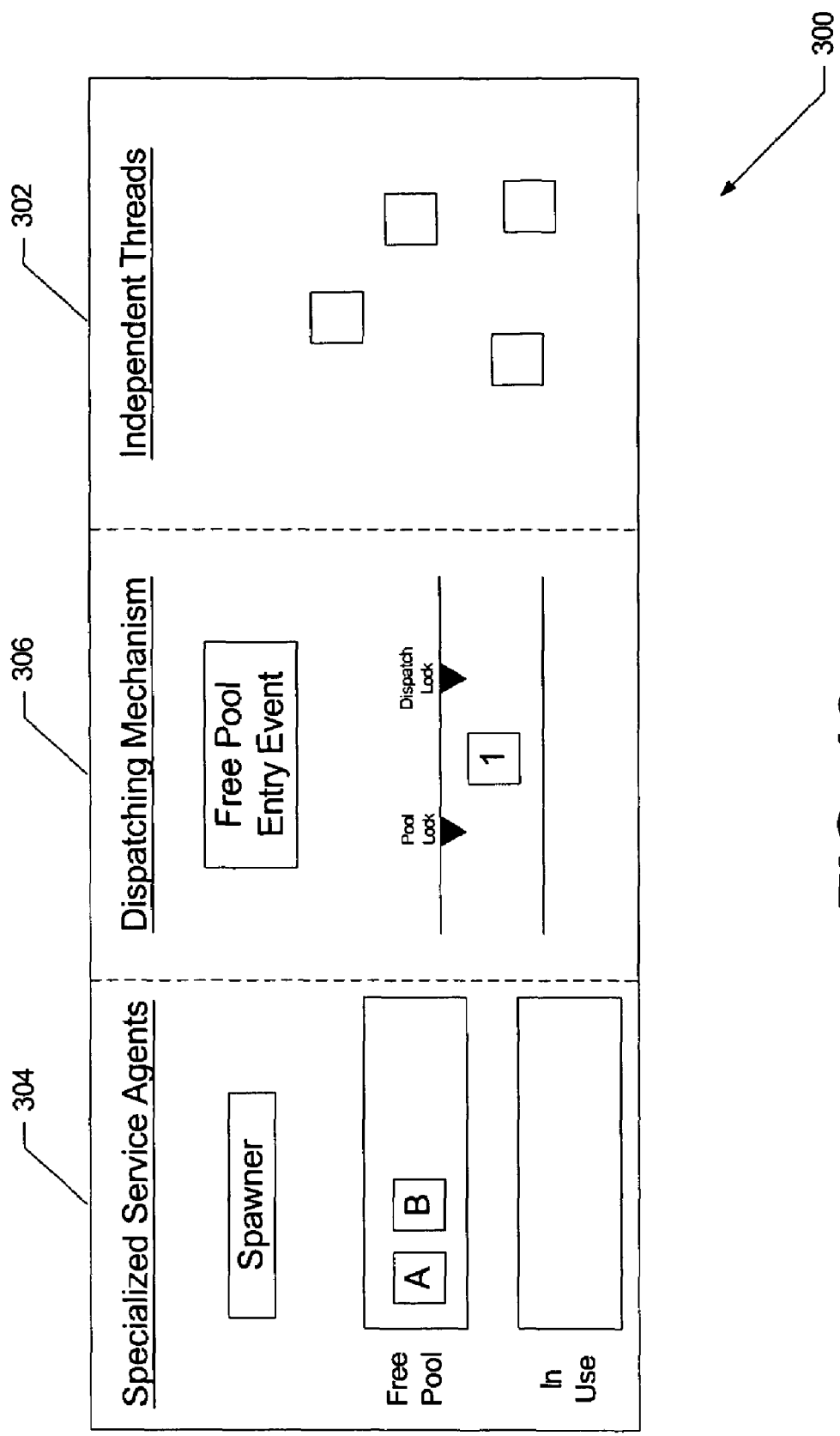
Figure 14:
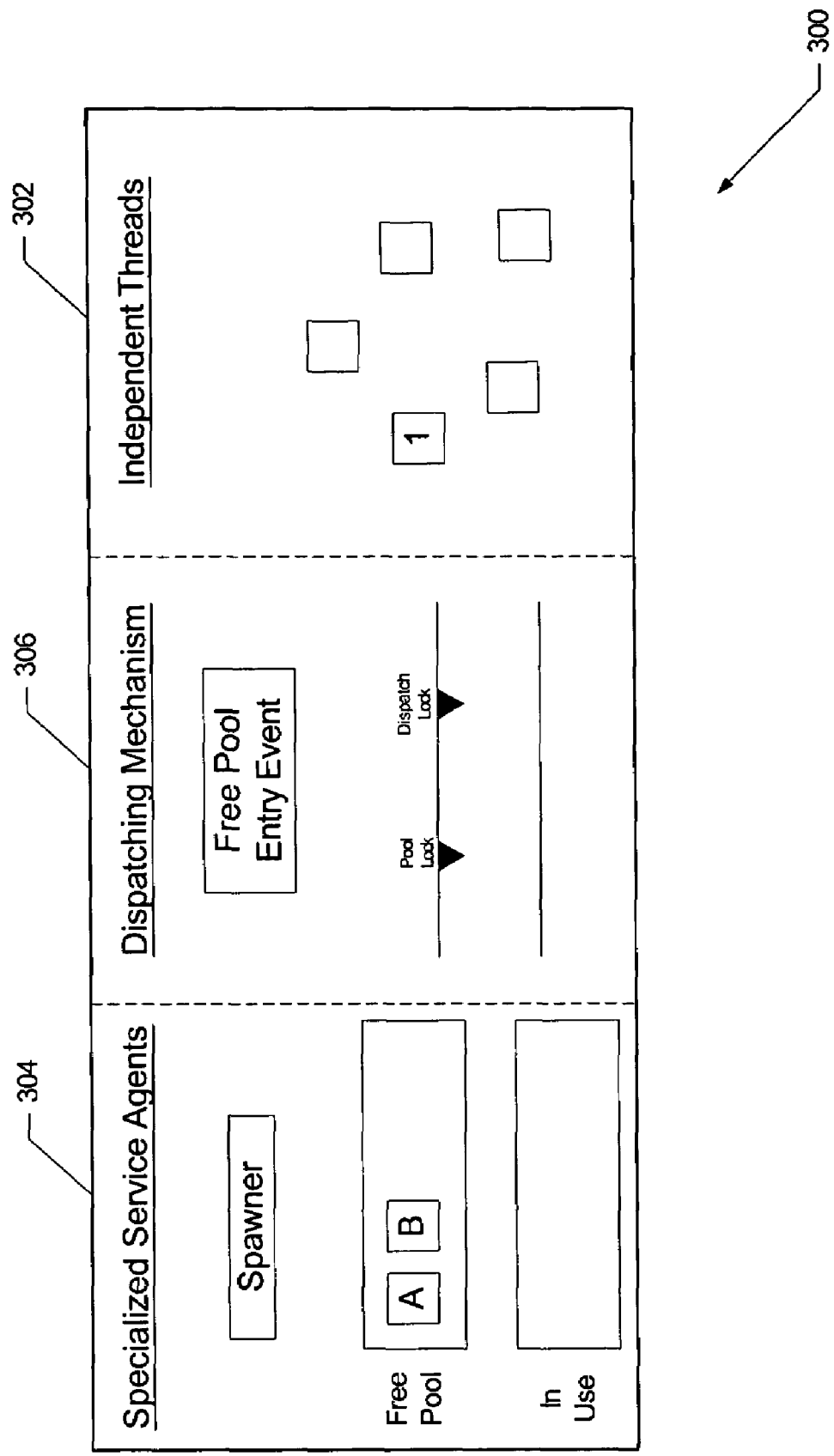

After the dispatch lock is released as shown in FIG. 10, the dispatching mechanism provides an indication to service agent B to perform the desired service. Requesting thread "1" waits for the service work to be completed. After the service work has completed, requesting thread "1" acquires the service pool lock as shown in FIG. 11. This allows service agent B to return to the free pool as shown in FIG. 12. Requesting thread "1" releases the pool lock as shown in FIG. 13 and resumes its execution as shown in FIG. 14.

Figure 15:
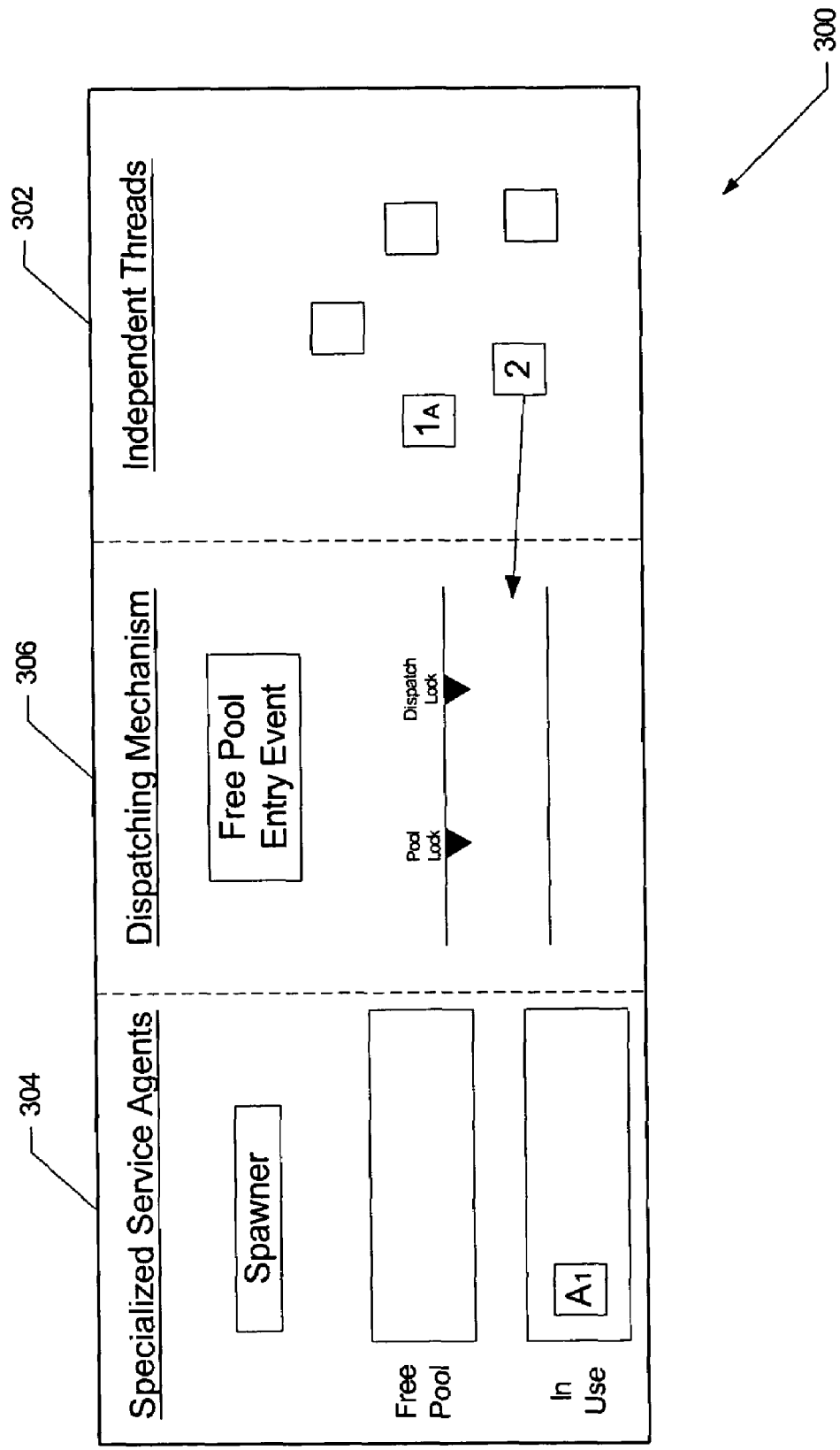
FIGS. 15-22 are block diagrams depicting an example of spawning service agents for use in a services dispatching system.

FIG. 15 depicts another example of using a dispatching system with nested locks. In this example, requesting thread "1" has already acquired service agent A from the free pool. This is indicated in FIG. 15 by service agent A being designated as "in use." Requesting thread "2" wishes to acquire the services from the free pool, and accordingly accesses the dispatching mechanism 306.

Figure 16:
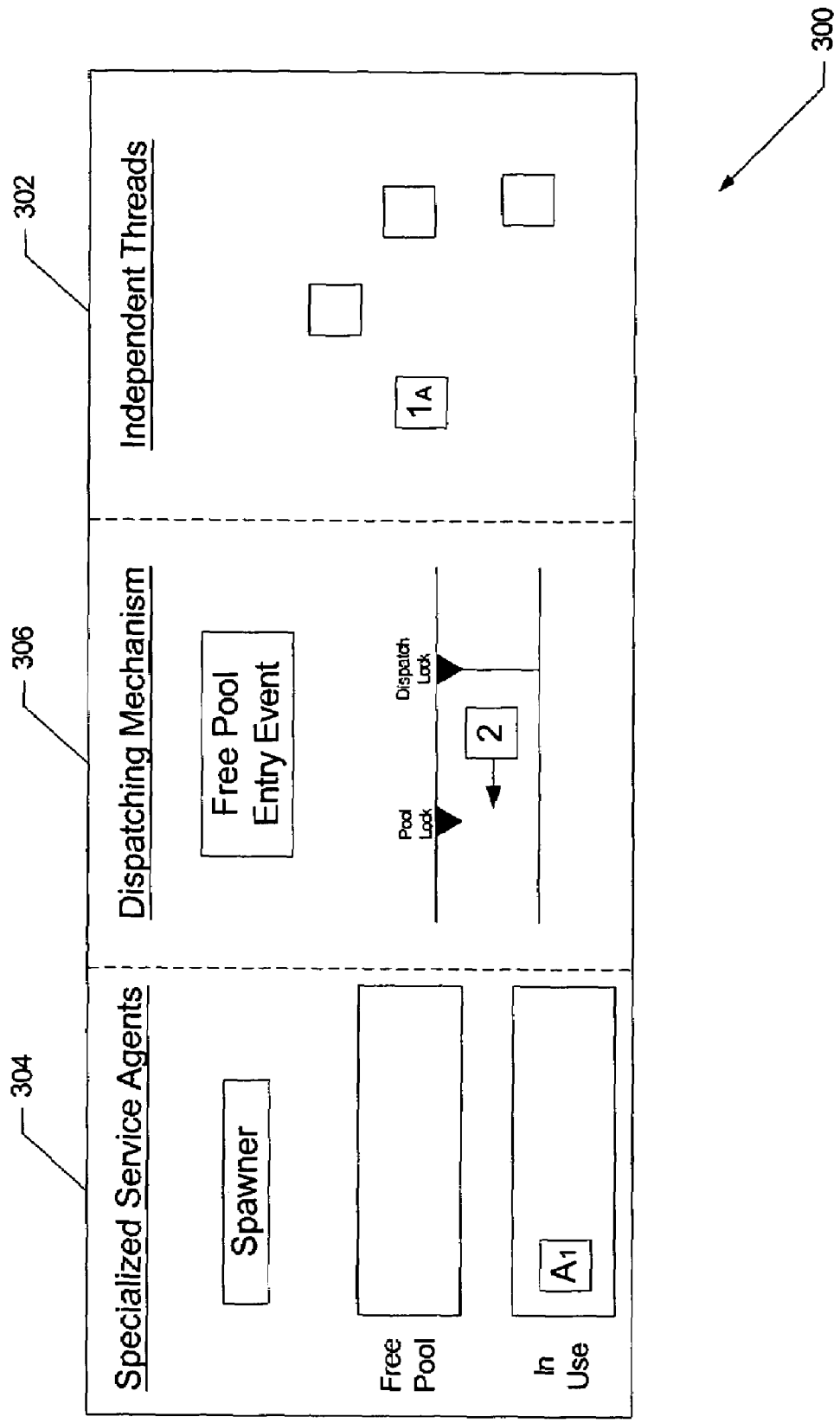
Figure 17:
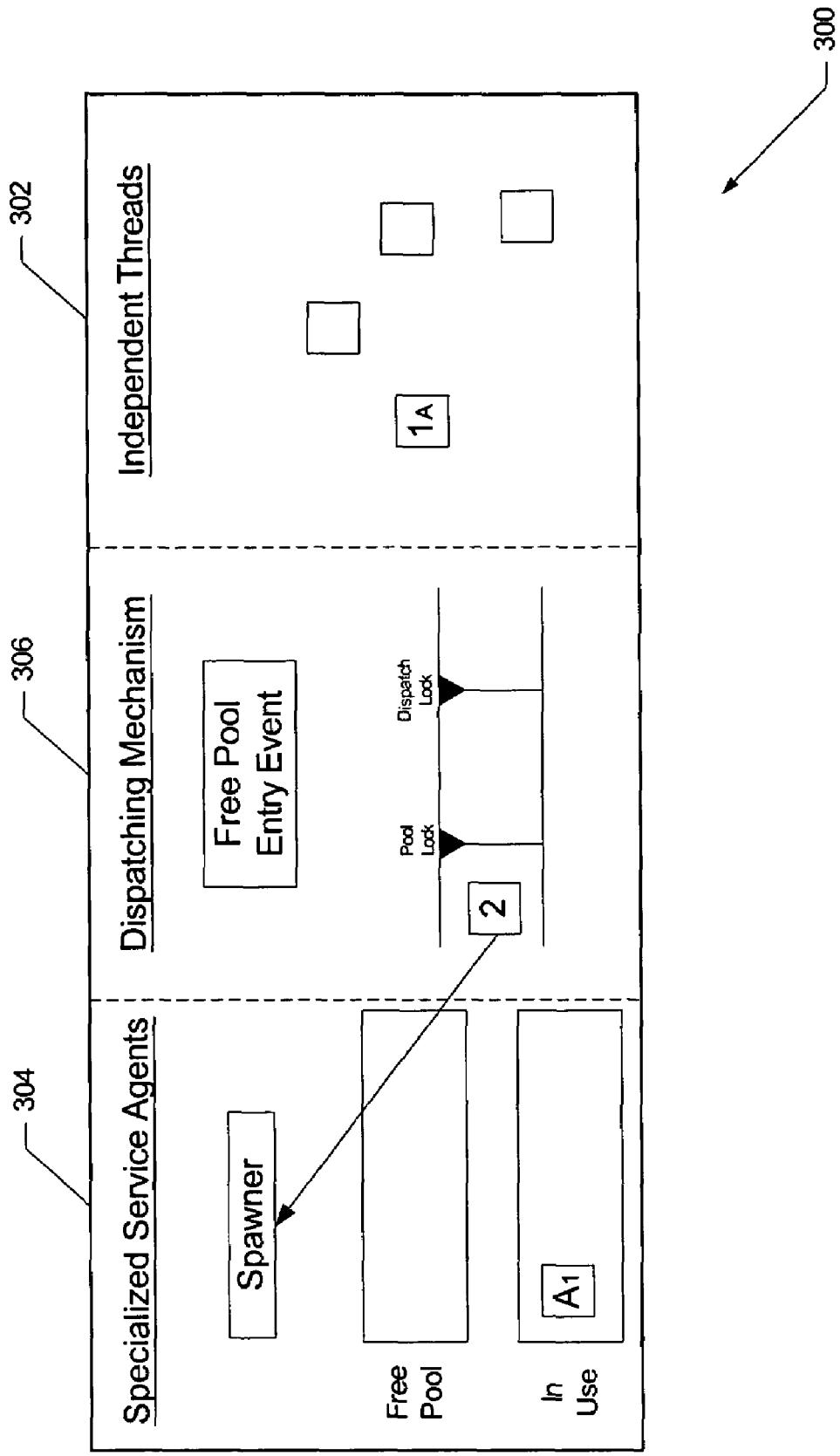

FIG. 16 shows that requesting thread "2" has acquired the dispatch lock, and FIG. 17 shows that requesting thread "2" has acquired the pool lock. Because a service agent is not available in the free pool, an additional service agent is needed, and a requester waits inside the dispatch section for an available service agent. This provides an economy in the number of events that must be initialized and maintained. The dispatcher preferably must have an event to accommodate a waiting requester and each agent carries an event upon which a requester will wait (when the request is dispatched). The greater body of requesters do not need to supply an event to wait upon when they make a request, nor does the dispatcher create one at request time.

The requesting thread signals to the spawner to create a service agent. The spawner may initialize and create some initial number of service agents before it awaits additional spawning requests. The initial number of service agents depends upon the situation at hand and may be based upon such factors as the expected concurrent demand for services from the independent threads.

Figure 18:
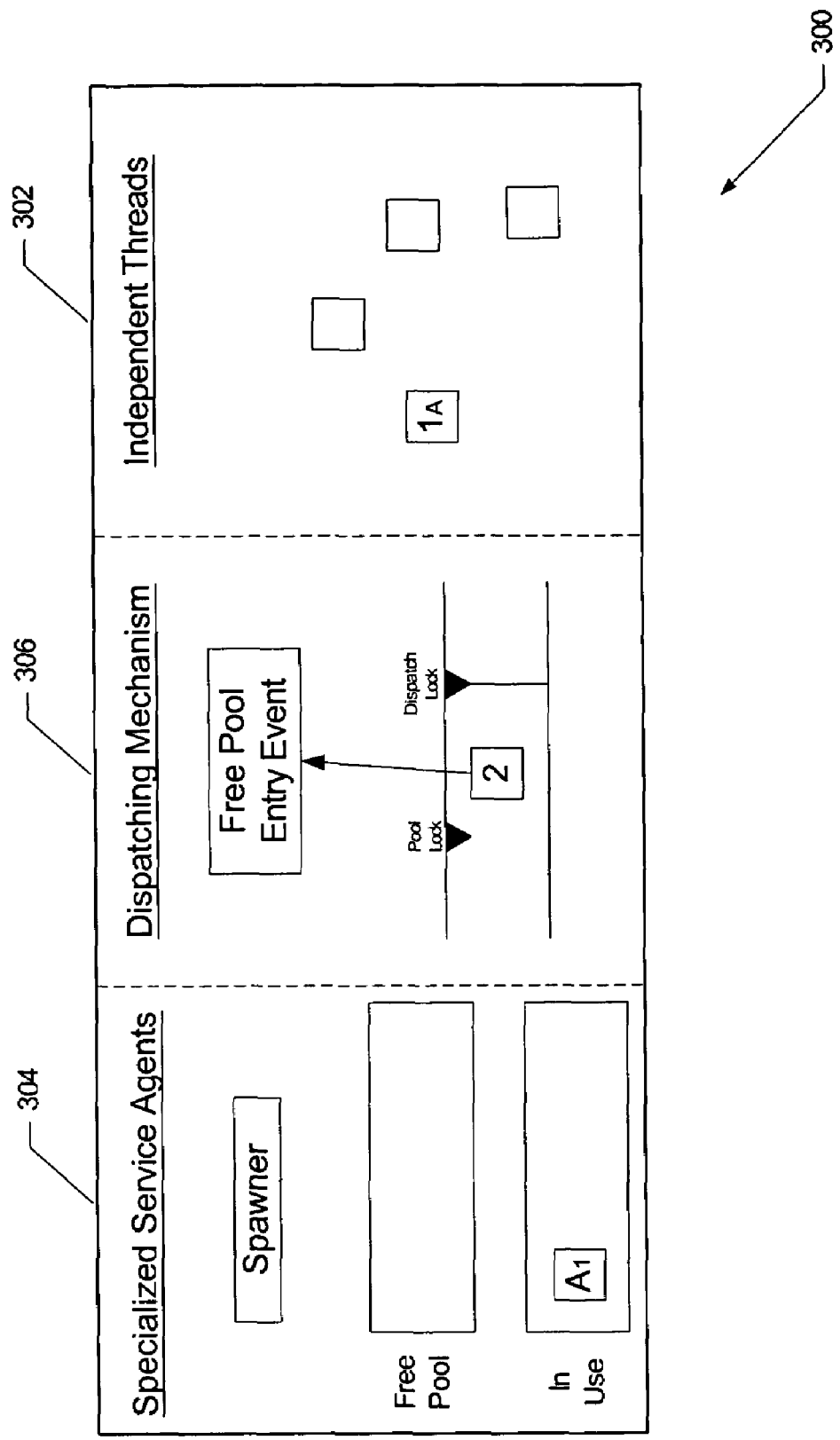

As shown in FIG. 18, the requesting thread releases the pool lock and waits for the service agent to enter the free pool. This may be accomplished by having the requesting thread wait for an event that indicates that a new service agent has entered the free pool.

Figure 19:
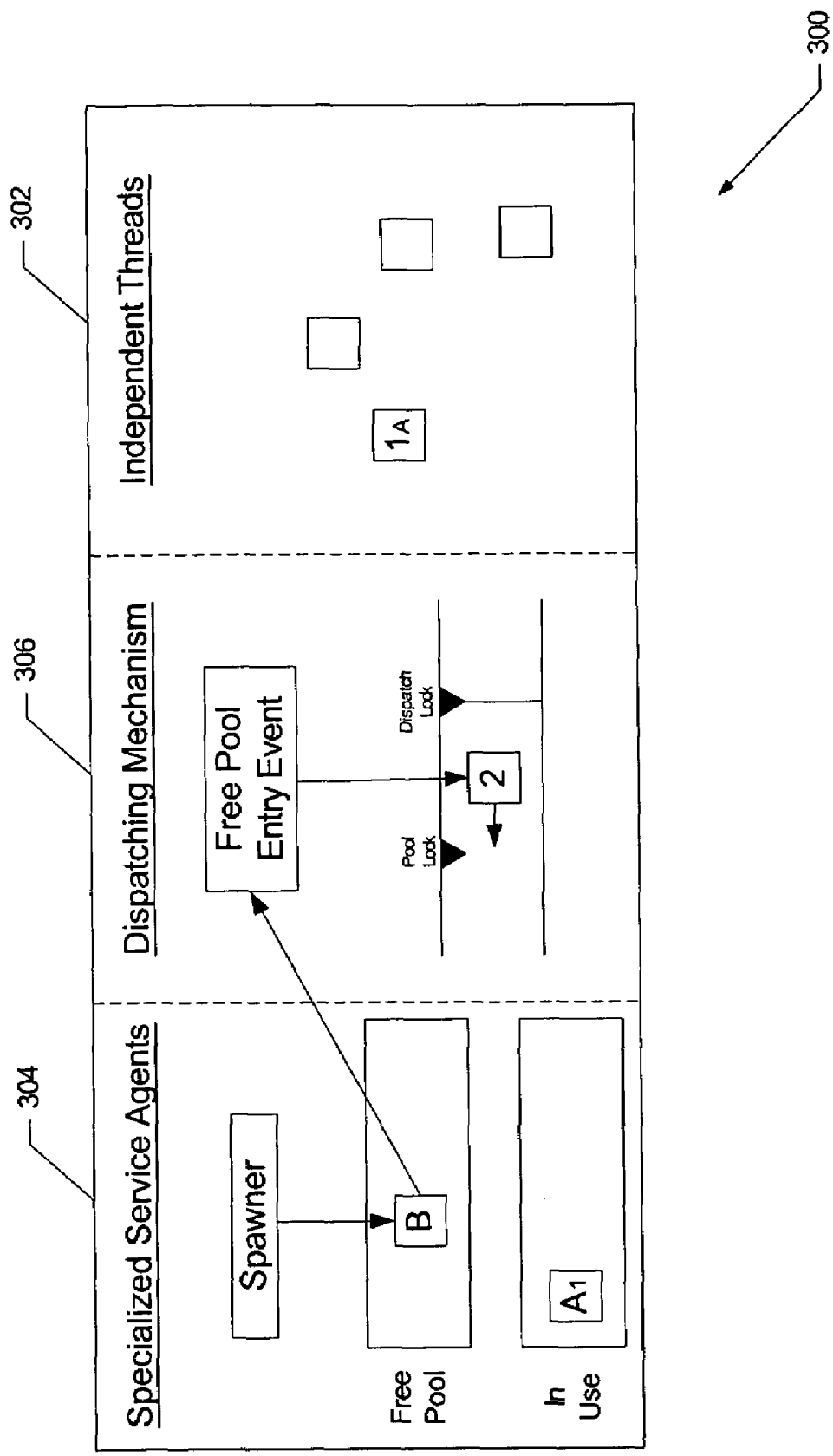
Figure 20:
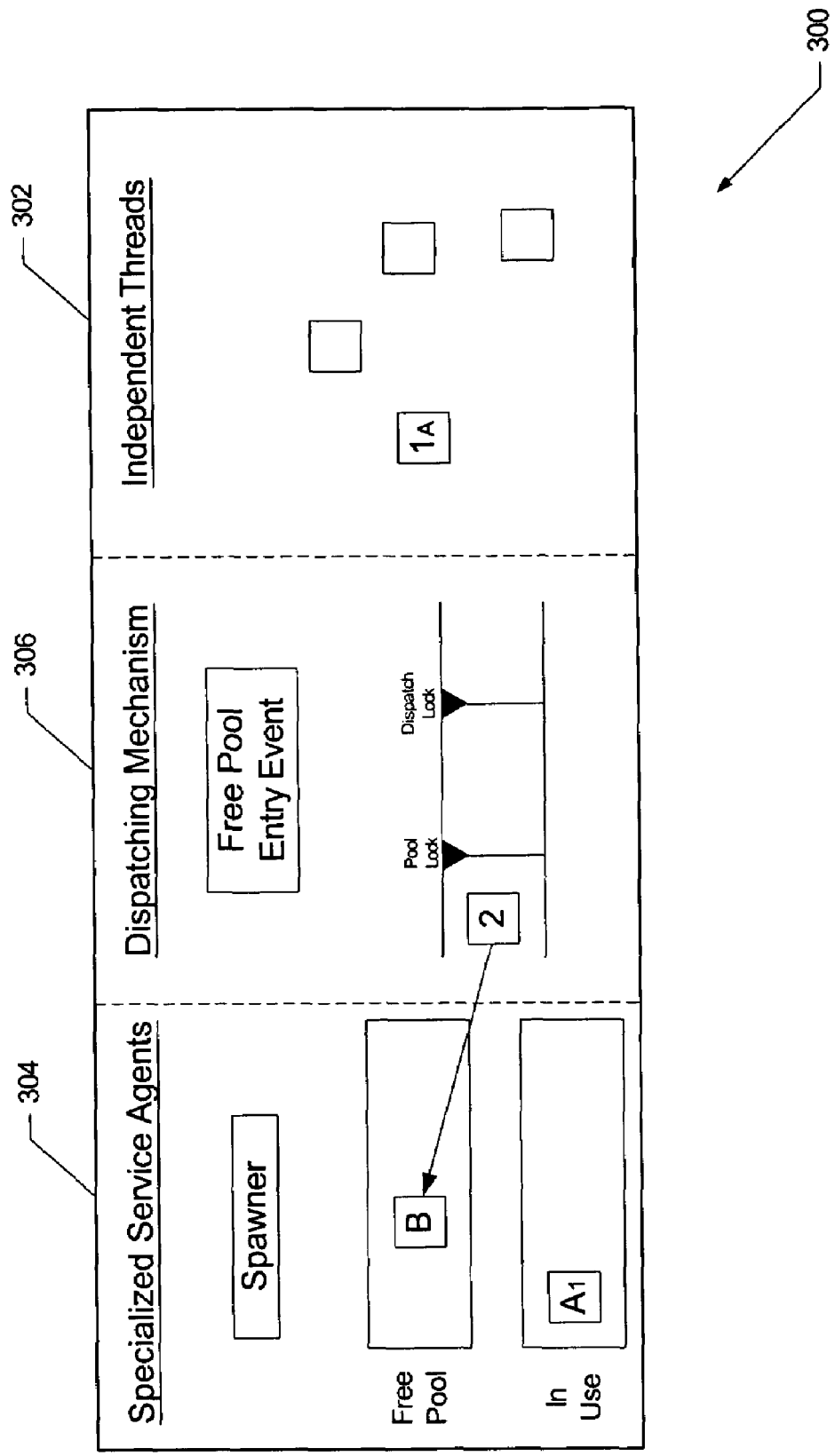

FIG. 19 shows that the spawner has created service agent B which triggers the free pool entry event. The event notification results in the requesting thread acquiring the pool lock. FIG. 20 shows that the requesting thread has acquired the pool lock. Because service agent B is available in the free pool, it can be used to service the request of the requesting thread. When a service agent is created, it initializes and enters the pool of free (unemployed) service agents, awaiting a request to operate upon. A requesting thread prepares the service-specific parameters by passing their addresses/values in a generic way to the direct dispatch method, such as in a control block instance that is private to the requesting thread.

Figure 21:
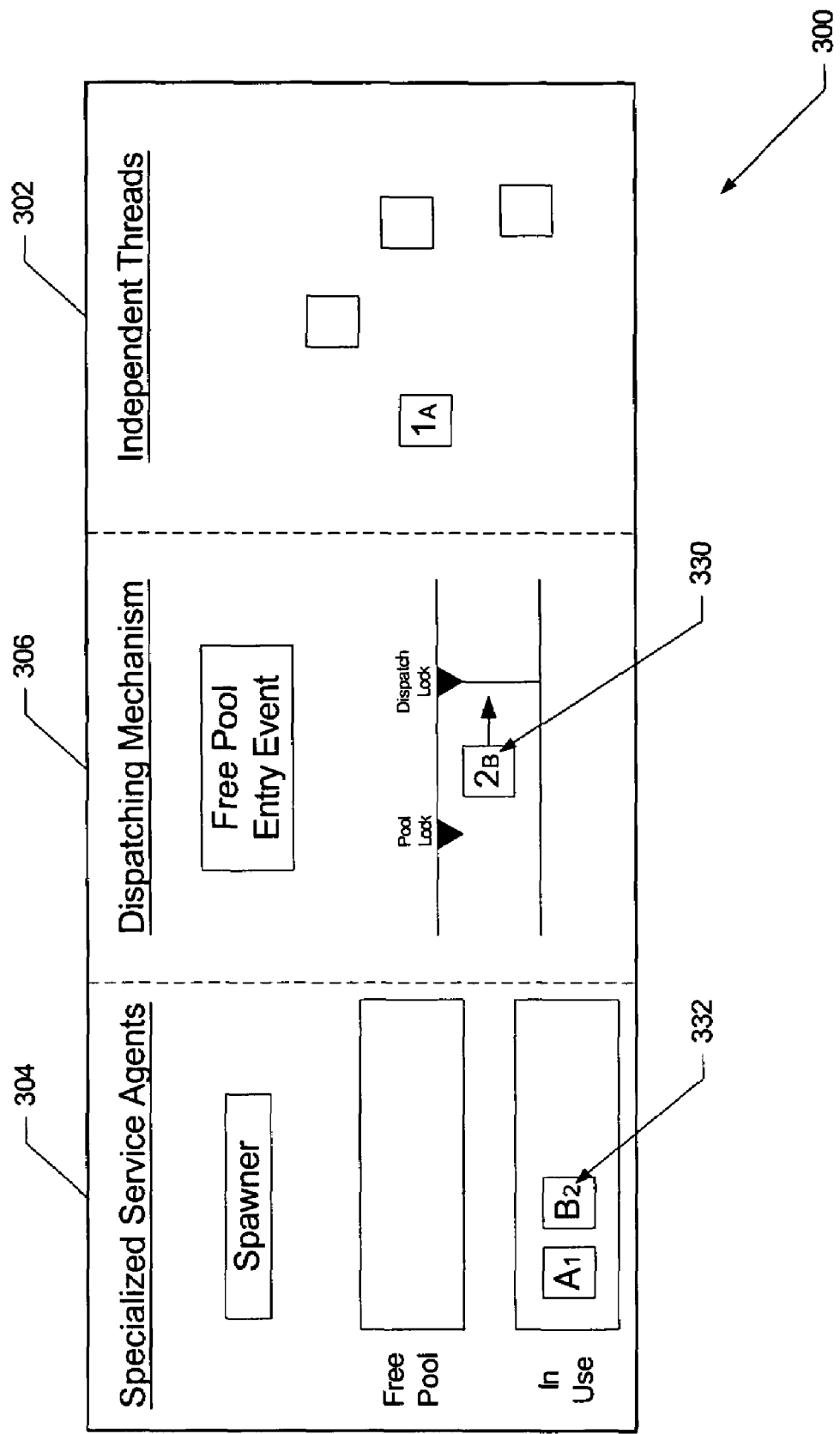

As shown in FIG. 21, service agent B is in use at this point and the pool lock is released for the requesting thread "2". The "B" shown at reference number 330 for requesting task "2" and the "2" shown at reference number 332 for service agent B indicate the synchronization between that requesting task and the service agent.

Figure 22:
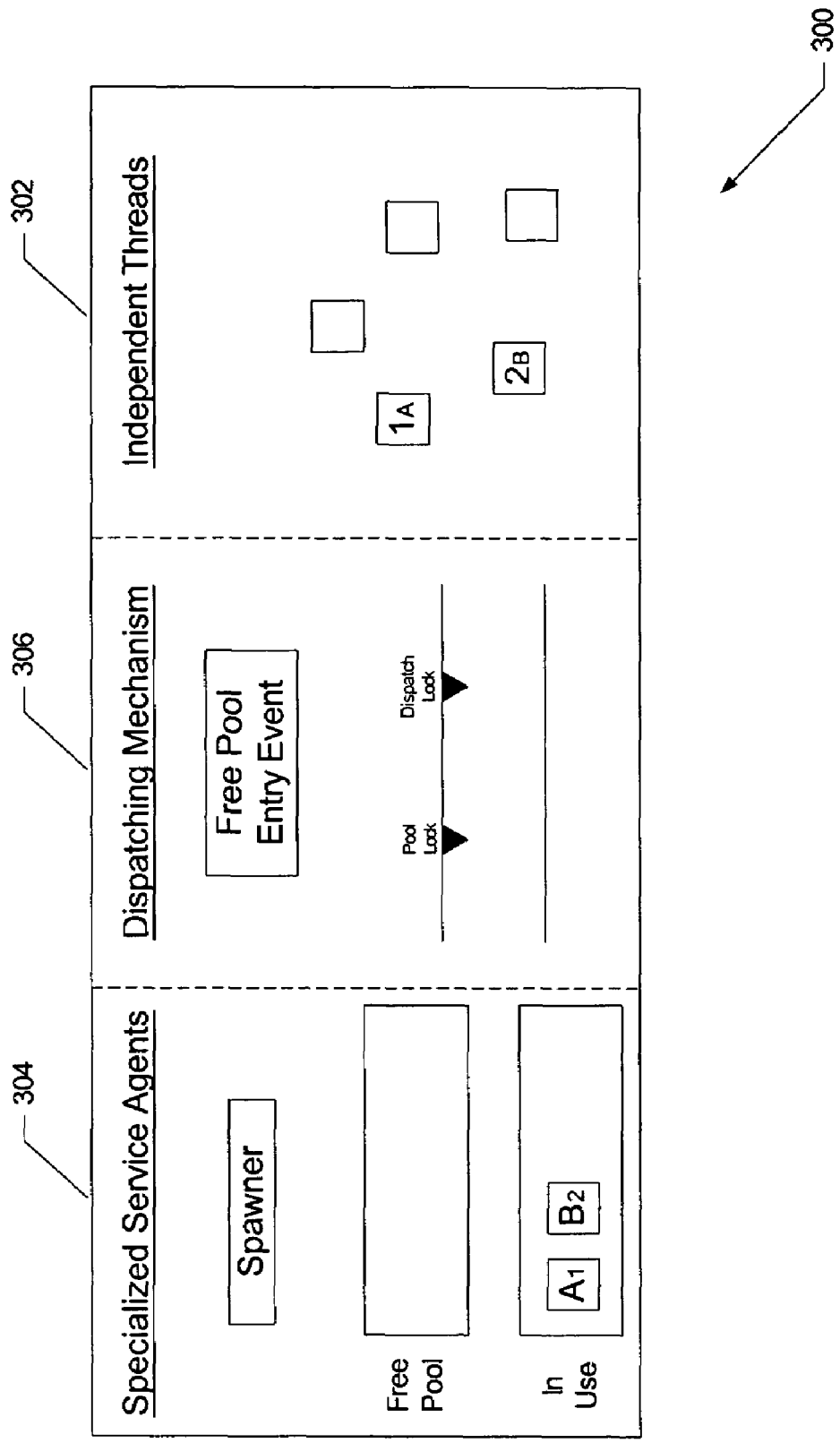

After the dispatch lock is released as shown in FIG. 22, the dispatching mechanism provides an indication to service agent B to perform the desired service agent. Requesting thread "2" waits for the service work to be completed. After the service work has completed, requesting thread "2" acquires the service pool lock. This allows service B to return to the free pool. Requesting thread "2" then releases the pool lock and resumes its execution.

Figure 23:
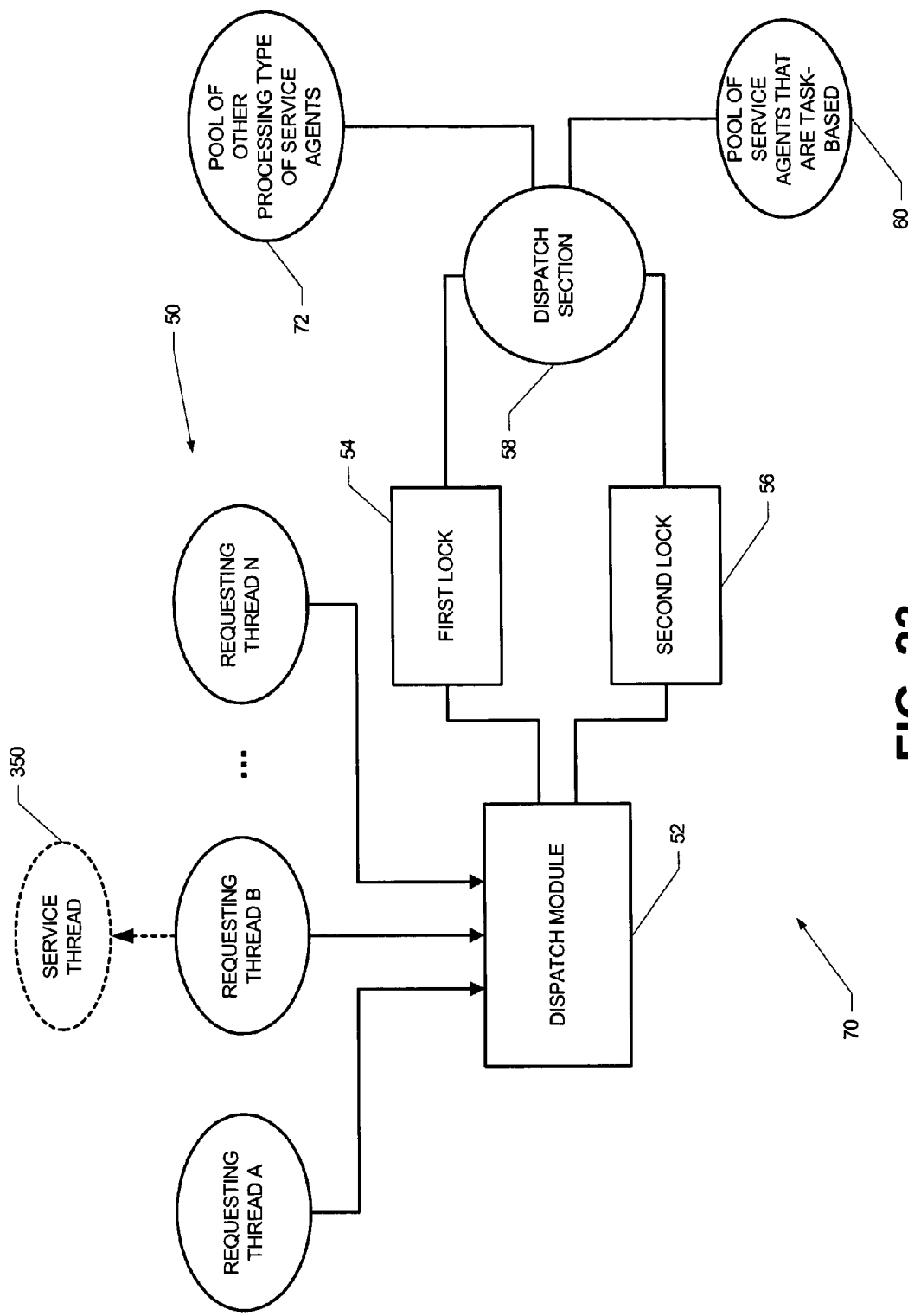
FIG. 23 is a block diagram depicting another type of service agent being utilized in a services dispatching system.

While examples have been used to disclose the invention, including the best mode, and also to enable any person skilled in the art to make and use the invention, the patentable scope of the invention is defined by the claims, and may include other examples that occur to those skilled in the art. For example as shown in FIG. 23, one or more of the requesting threads 50 may utilize the nested locks (54, 56) to access pools 60 and 72 while another one accesses a service thread 350 (that is outside of the service pools 60 and 72) without utilizing the nested locks (54, 56).

As another example, many different ways may be used to handle the operations involved in the nested lock. As an illustration, the dispatch module running in the requesting thread context may handle the acquisition and releasing of the locks as well as interacting with a spawner in creating new service agents. With such an approach, a request can be completed with only two thread context switches. The dispatch module may also perform other operations, such as awaiting a signal or event that a service thread has entered the free pool, or posting (giving addressability to) the parameter block to the waiting service agent, or passing parameters between requesting threads and service agents.

The systems and methods disclosed herein may be implemented on various types of computer architectures, such as for example on a single general purpose computer or workstation, or on a network (e.g., local area network, wide area network, or internet), or in a client-server configuration, or in an application service provider configuration. As an illustration, the requesting threads, dispatching mechanism, and specialized service agents may reside on the same computer or each may reside on different computers interconnected through a network, such as an intranet or internet type of network.

In multiple computer systems, data signals may be conveyed via fiber optic medium, carrier waves, wireless networks, etc. for communication among computers. Also, the systems' and methods' data may be stored as one or more data structures in computer memory depending upon the application at hand. The systems and methods may be provided on many different types of computer readable media including instructions being executable by a computer to perform the system and method operations described herein.

The computer components, software modules, functions and data structures described herein may be connected directly or indirectly to each other in order to allow the flow of data needed for their operations. It is also noted that a software module may include but is not limited to being implemented as one or more sub-modules which may be located on the same or different computer. A module may be a unit of code that performs a software operation, and can be implemented for example as a subroutine unit of code, or as a software function unit of code, or as an object (as in an object-oriented paradigm), or as an applet, or in a computer script language, or as another type of computer code.

It is claimed as the invention:

1. A computer-implemented apparatus having a processor for handling thread requests in a disparate computer environment, wherein the disparate computer environment arises because the threads requesting services are preemptively scheduled entities whereas service agents servicing the requests are cooperatively scheduled entities, wherein the threads requesting services are preemptively scheduled entities because processing of the threads requesting services can be temporarily interrupted, said apparatus comprising:

a dispatch lock that is acquired by the requesting threads to allow a thread to gain access to a dispatch section one at a time;

a service pool lock for synchronizing one of the requesting threads, that has gained access to the dispatch section, with one of the service agents;

wherein the dispatch lock and the service pool lock are nested relative to each other such that the service pool lock is acquired while holding the dispatch lock in order to synchronize the service agent with the requesting thread that has gained access to the dispatch section;

wherein, after the requesting thread releases the dispatch lock and the service pool lock, the service agent handles the request of the requesting thread.

2. The apparatus of claim 1, wherein the requesting thread prepares parameters that are to be passed to the synchronized service agent.

3. The apparatus of claim 1, further comprising:
a dispatch module which passes the parameters to the synchronized service agent.

4. The apparatus of claim 3, wherein the dispatch module operates in the requesting thread's context.

5. The apparatus of claim 3, wherein the dispatch module selects a service agent that is free from a pool of services.

6. The apparatus of claim 5, wherein if a free service agent is not available from the pool, then the dispatch module requests and awaits the creation of another service agent that can perform the request of the thread.

7. The apparatus of claim 6 further comprising:
a spawner that creates another service agent based upon the request from the dispatch module.

8. The apparatus of claim 5, wherein if a free service agent is not available from the pool, then the dispatch module waits on an extant service agent to complete its assignment, wherein the extant service agent is used to service the request of the thread.

9. The apparatus of claim 5, wherein when the service agent completes a request, notification is provided to the waiting requesting thread, and reenters the pool of free service agents in order to await another request from a requesting thread.

10. The apparatus of claim 1, wherein the dispatch lock involves a synchronization point for dispatching the service request.

11. The apparatus of claim 10, wherein the dispatch lock does not involve the requesting thread awaiting completion of a service agent that is handling the request of the thread.

12. The apparatus of claim 1, wherein the service agent is task-based in that services are cooperatively scheduled.

13. The apparatus of claim 12, wherein the task-based service agent operates in a single-threaded environment.

14. The apparatus of claim 12, wherein the task-based service agent operates in a cooperative multi-tasking environment, wherein only one task-based service agent can execute at a time.

15. The apparatus of claim 14, wherein a first pool of services includes task-based service agents, wherein a second pool of services includes thread-based service agents, wherein the dispatch lock and service pool lock are used in accessing the first and second pools of service agents.

16. The apparatus of claim 1, wherein utilization of the requesting threads constitutes a technological advance over the use of the service agents.

17. The apparatus of claim 16, wherein the service agents constitute a legacy system which becomes substantially compatible with the requesting threads through use of the first and second locks;

wherein the legacy system includes task-based code that becomes compatible with the requesting thread through utilization of the first and second locks.

18. A processor-implemented method for handling thread requests in a disparate computer environment, wherein the disparate computer environment arises because the threads requesting services are preemptively scheduled entities whereas service agents servicing the requests are cooperatively scheduled entities, wherein the threads requesting services are preemptively scheduled entities because processing of the threads requesting services can be temporarily interrupted, said method comprising:

acquiring a dispatch lock by the requesting threads to allow a thread to gain access to a dispatch section one at a time;

using a service pool lock to synchronize one of the requesting threads, that has gained access to the dispatch section, with a service agent;

wherein the dispatch lock and the service pool lock are nested relative to each other such that the service pool lock is acquired while holding the dispatch lock in order to synchronize the service agent with the requesting thread that has gained access to the dispatch section;

wherein, after the requesting thread releases the dispatch lock and the service pool lock, the service agent handles the request of the requesting thread.

19. The method of claim 18, wherein the requesting thread prepares parameters that are to be passed to the synchronized service agent.

20. The method of claim 18, further comprising:
passing parameters from a dispatch module to the synchronized service agent.

21. The method of claim 20, wherein the dispatch module operates in the requesting thread's context.

22. The method of claim 20, wherein the dispatch module selects a service agent that is free from a pool of services.

23. The method of claim 22, wherein if a free service agent is not available from the pool, then the dispatch module requests and awaits the creation of another service agent that can perform the request of the thread.

24. The method of claim 23, further comprising:
creating another service agent based upon the request from the dispatch module.

25. The method of claim 20, wherein if a free service agent is not available from the pool, then the dispatch module waits on an extant service agent to complete its assignment, wherein the extant service agent is used to service the request of the thread.

26. The method of claim 20, wherein when the service agent completes a request, notification is provided to the waiting requesting thread, and reenters the pool of free service agents in order to await another request from a requesting thread.

27. The method of claim 18, wherein the dispatch lock involves a synchronization point for dispatching the service request.

28. The method of claim 27, wherein the dispatch lock does not involve the requesting thread awaiting completion of a service agent that is handling the request of the thread.

29. The method of claim 18, wherein the service agent is task-based in that services are cooperatively scheduled.

30. The method of claim 29, wherein the task-based service agent operates in a single-threaded environment.

31. The method of claim 29, wherein the task-based service agent operates in a cooperative multi-tasking environment, wherein only one task-based service agent can execute at a time.

32. The method of claim 31, wherein a first pool of services includes task-based service agents, wherein a second pool of services includes thread-based service agents, wherein the dispatch lock and the service pool lock are used in accessing the first and second pools of service agents.

33. The method of claim 18, wherein utilization of the requesting threads constitutes a technological advance over the use of the service agents.

34. The method of claim 33, wherein the service agents constitute a legacy system which becomes substantially compatible with the requesting threads through use of the first and second locks;
  wherein the legacy system includes task-based code that becomes compatible with the requesting thread through utilization of the first and second locks.

\* \* \* \* \*